No. 887,390.

J. L. HALL.
STRUCTURAL SLIDE RULE.
APPLICATION FILED OCT. 12, 1907.

PATENTED MAY 12, 1908.

2 SHEETS—SHEET 1.

WITNESSES

INVENTOR
John L. Hall
BY   ATTORNEYS

No. 887,390. PATENTED MAY 12, 1908.
J. L. HALL.
STRUCTURAL SLIDE RULE.
APPLICATION FILED OCT. 12, 1907.
2 SHEETS—SHEET 2.
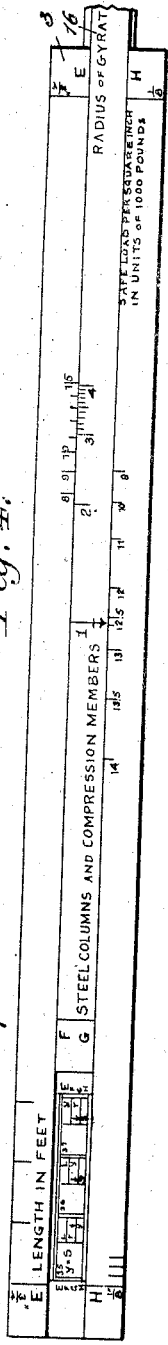
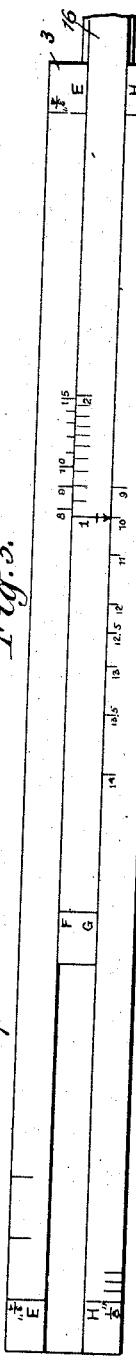
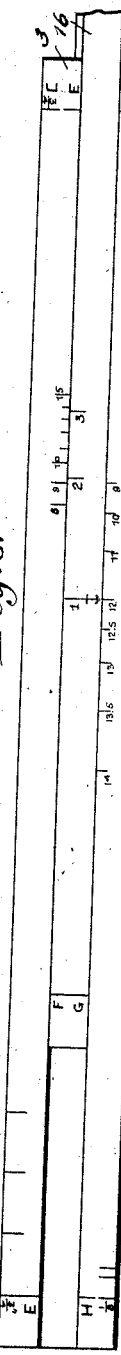
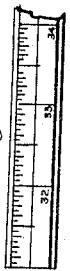
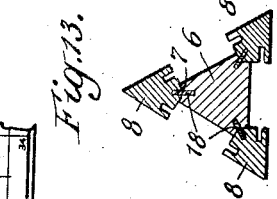
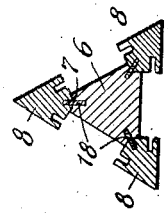
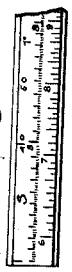
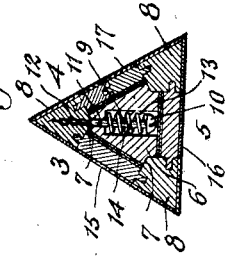
WITNESSES
INVENTOR
John L. Hall
BY
Duncan & Duncan
ATTORNEYS

UNITED STATES PATENT OFFICE.

JOHN L. HALL, OF NEW YORK, N. Y.

STRUCTURAL SLIDE-RULE.

No. 887,390.

Specification of Letters Patent.

Patented May 12, 1908.

Application filed October 12, 1907. Serial No. 397,093.

*To all whom it may concern:*

Be it known that I, JOHN L. HALL, a citizen of the United States, and resident of New York, in the county and State of New York, have invented certain new and useful Improvements Relating to Structural Slide-Rules, of which the following is a specification, taken in connection with the accompanying drawings.

My invention relates to structural slide rules and more particularly to, first, the mechanical construction of such a rule, and, second, the co-location of certain scales upon the different faces of the structural slide-rule, which is preferably in the form of a triangular rule so as to enable a person familiar with such instruments of precision to solve mechanically and quickly problems arising in the erection of buildings, bridges, and so forth, without the necessity of resorting to complex and intricate solutions.

Upon the three faces of the triangular rule I have placed different scales and arranged slides so that after computing mechanically on one face of the rule the slide can be left in that position while another problem is mechanically solved on another face without changing or altering in any particular the relative location of the slide on the first face.

By my invention I have produced an instrument of precision equally fit for a triangular, engineering or architectural scale and a complex slide rule. Furthermore, by interchanging the slides upon the respective faces of the rule other intricate problems may be solved mechanically, as will later be pointed out.

Figure 1:
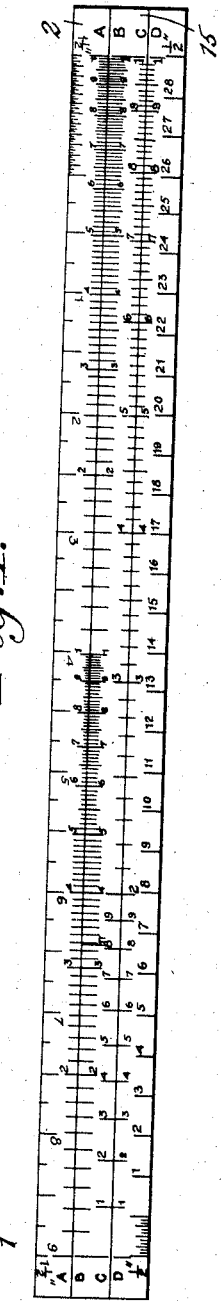
Figure 2:
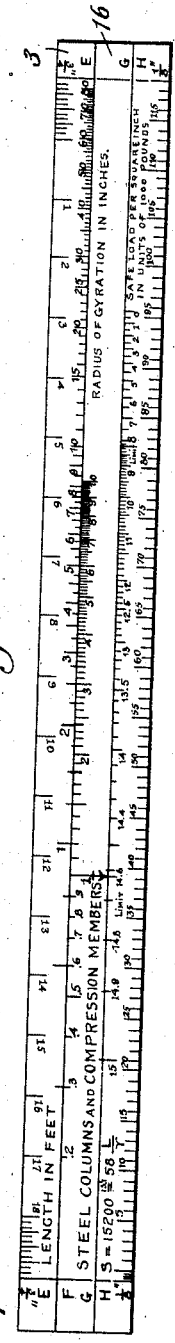
Figure 3:
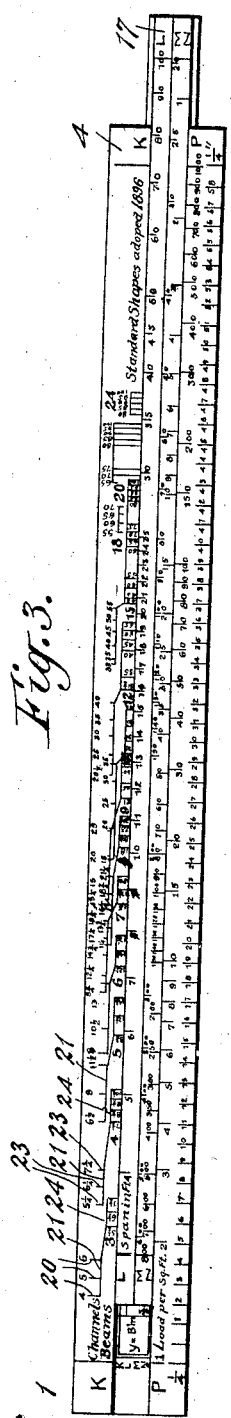

In the accompanying drawings, showing an illustrative embodiment of this invention, in which the same reference numerals refer to the similar parts in the several figures. Figures 1, 2, and 3 are side elevations of the three faces of my structural slide rule. Figs. 4, 5 and 6 are side elevations of the face of my rule shown complete in Fig. 2, the slide being adjusted to different positions to better illustrate its use in solving certain problems hereinafter referred to. Fig. 7 illustrates a scale on the back of the slide shown in Fig. 1. Fig. 8 shows a scale on the back of the slide in Figs. 4, 5 and 6. Fig. 9 is a scale on the back of the slide shown in Fig. 3. Fig. 10 is a cross-section of the structural slide rule showing the preferred form. Fig. 11 is a cross-section showing a modified form. Fig. 12 is a cross-section showing a still further modified form. Fig. 13 is a cross-section, the slides being omitted, of a still further form.

*Structure of the rule.*—In the illustrated embodiment of the invention shown in the drawings, 1 is a triangular slide rule having three faces, 2, 3 and 4, illustrated respectively in Figs. 1, 2 and 3 of the drawing, see also Fig. 10. In the preferred form, the triangular rule consists of a core 6 having angular seats 7, 7 and 7 to which are secured prismatic flanges 8, 8, 8, by means of screws 9 having a head 10, shank 11, and threads 12. These screws 9 are mounted in holes 13 in the core, three such screws being preferably used to hold each prismatic flange 8 to its respective seat 7 on the core 6. The holes 13 are preferably of at least two diameters, the larger being adapted to receive the head of the screw.

Any suitable yielding medium, such as a coil spring 14, preferably a compression spring, one end of which bears against the head of the screw and the other against the bottom of the hole 13, may be used, the arrangement preferably being such that there are no screw threads upon the portion of the shank passing through the smaller portion of the hole 13, so that the prismatic flange 8 may be held yieldingly to its seat 7 by means of the screw and spring to compensate for contraction and expansion. This adjustment permits the use of tight fitting slides without their binding in the grooves. To insure absolute alinement I preferably bore the holes 13 in the core before the flange is sawed from it. Within each face of the rule I locate slides 15, 16 and 17, respectively, mounting them in any suitable manner so that they can readily slide within the respective faces of the rule. The sides of the prismatic flanges and the faces of the slides are flush and make a neat and attractive triangular slide rule and one which can be placed flat upon any desired work so that in addition to its uses hereinafter referred to, it performs the ordinary function of a triangular rule.

There are various ways of mounting the core 6 with relation to the prismatic flanges, as for instance, in Fig. 11 I may have the core and flanges integral, while in the other figures, the core and flanges are shown separate. In Fig. 12, the flanges are mitered and glued together, while in Fig. 13 the flanges are shown made from one piece of material, but in both Figs. 12 and 13 the flanges are shown connected to the core by means of splints 18, 18. The contours of the core and flanges may also vary, but all such constructions come under the terms of my invention.

While all the parts of my structural slide rule may be made out of wood, metal, or any other suitable material, or the rule may be made partly of metal, and partly of wood, as for instance, the flanges may be of metal and the slides of wood, or vice-versa, I preferably for the sake of cheapness in manufacture, and for lightness, make all the parts of my slide rule out of wood, preferably cherry wood, although it is to be understood that I am not at all limited to such material. Upon the different faces and slides, I secure in any suitable manner scales which may be either impressed or engraved directly upon the material of which the slide rule is made or, as is common, the scale may be first engraved upon plates and the printed scales from such plates secured in any suitable manner to the faces and slides of the rule, being before or afterwards waterproofed with some transparent medium, as is usual.

*Scales.*—These different scales I have designated by the letters A, B, C, D, E, F, G, H, K, L, M, N, and P, respectively; the scales A, B, C, D being upon face 2 of my structural slide rule, the scales E, F, G, H upon face 3, and scales K, L, M, N, P, upon face 4, all as clearly shown in Figs. 1 to 3, inclusive. Scales A, B, C, D comprise the ordinary logarithmic scales, the use of which is a matter of common knowledge among engineers, so that it is not necessary to go fully into this matter other than to point out that on the surface of the core 6, the same being the bottom of the trough between the two prismatic flanges 8, 8, which form guides for the slide 15, I preferably place a key, the use of which is well known among engineers, as follows:

*Direct Slide.*

| A | 8 | | b | y | 9 | | b | | 10 | | y |
|---|---|---|---|---|---|---|---|---|---|---|---|
| B | | $y=\frac{bx}{a}$ | a | x | | $y=\sqrt{\frac{bx}{a}}$ | a | x | | $y=\frac{b^2x}{a}$ | a | x |
| C | | | | | | | | | | | |
| D | | | | | | | | y | | | b |

The scales A, B, C, D are used to compute mechanically the total safe load which can be carried.

On face 3 I arrange the scale E which is on one of the prismatic flanges, and scales F, G upon the slide 16, the scale H being upon the face of the complementary prismatic flange 8. This expression $\frac{l}{r}$ signifies the ratio existing between the unsupported length $l$ and the radius of gyration $r$ of a column, post, strut, or compression member. This ratio in some form enters into all formulas proposed by engineers to determine the load per square inch of sectional area that a column will safely carry. The formula $$S = 15200 - 58\frac{l}{r},$$

in which S represents the safe load per square inch of the sectional area of the column, is such a formula and is shown on scale H near the extreme left of Fig. 2. To find the value of S for any specific case, it is necessary to substitute the known values of $l$ and $r$ and solve the equation. Without giving examples of such equations and the intricate computations which have to be entered into for their solution, it may be said that by my invention I am enabled to save all the exhausting calculations by giving the results mechanically upon my structural slide rule. In Fig. 4 I have shown this face of my structural slide rule with sufficient portions of the different scales shown so as to illustrate its use.

Keeping in mind the expression $\frac{l}{r}$, a scale of lengths ($l$) is placed on the upper flange of the rule; a scale of radii of gyration ($r$) immediately under it on the slide; a scale of loads in thousands of pounds is placed on the lower flange, and these scales are so related to one another that when the given radius of gyration ($r$) 3.4″ is brought directly under the given length ($l$) 12′ 9″, then the allowable load per sq. in. (S) 12590 lbs. will be indicated on the lower scale by an arrow which is on the slide.

In Fig. 5, I have shown another adjustment of the slide 16 to solve mechanically another problem. If any two of the factors, $r$, $l$ or S be given the third is readily found by my invention. The method of finding S has already been given. Now, suppose it is desired to know the least radius of gyration which a column 10 ft. long could have and safely carry 10,000 lbs. per sq. in. according to the above formula. Set the arrow at 10 on the lower scale, and under 10 on the upper scale, read the result on scale just below = 1.34″. With scales E, F, G, H, I am also able to determine mechanically and expeditiously the greatest unsupported length a column may have and be able to carry safely a certain load. Suppose, for instance, it is desired to know the greatest unsupported length a column may have and still be able to carry safely 12,000 pounds per square inch if its least radius of gyration is three inches. By manipulating the slide 16 carrying the scales F and G, Fig. 6, so as to set the arrow $l$ upon the slide 16 opposite 12, the answer can be instantly determined by a glance at the position of the numeral 3 on scale F which will show, on scale E, immediately above it, that the desired answer is 13′ 9″. These examples are merely given to show the use of the scale and how simply and quickly any problem confronting an architect or person using the scale can be solved. To assist in the use of the scales upon this face 3 of my structural rule I have placed a key on the core 6, the same forming the bottom of the trough lying between the two prismatic flanges upon which are mounted the scales E and H, said key being visible when the scale 16 is moved, for instance, to the right, as in Fig. 4, when the following symbols which are readily understood by all architects and draftsmen become visible:

| E | 35 | $l$ | 36 | $l$ | 37 | $y$ | E |
|---|---|---|---|---|---|---|---|
| F | | $r$ | | | | $r$ | F |
| G | $y=s$ | ↓ | $y=r$ | ↓ | $y=l$ | ↓ | G |
| H | | | | $y$ | | | H |
| | | $y$ | | $s$ | | $s$ | |

The remaining face 4 of the slide rule is illustrated in Fig. 3, the slide 17 being slightly drawn to the right to illustrate the use of the scale in a problem hereinafter mentioned, and also to show the key which, as in the other faces, is located in the trough lying between the scales K and P, respectively, on the prismatic flanges 8, 8. On this face are represented scales K, L, M, N, and P, and unlike in the other faces there are two slides adapted for relative movement on this side of the rule for use in solving problems to be hereinafter mentioned. In building operations, particularly in the modern fire-proof building, the area is usually laid out in rows of columns so as to divide the ground plan into rectangular panels, each panel being bounded by four columns. It is absolutely necessary that the beams be placed close enough together to insure safety, but they should not be closer than necessary to carry the required load, for such would be an expensive waste of material. It is therefore necessary in the planning of these buildings, or in the planning of any other structural work, to try out different schemes and make numerous calculations to determine the proper spacing of the beams or channels so as to obtain a perfectly safe structure with the required factor of safety, but still to use a minimum amount of material.

By the use of my invention, I have made it possible for a person designing such structures to obtain in a few seconds mechanically the exact size of beams or channels, together with their weight which would be required, under any given condition.

On the upper portion of the face 4, Fig. 3, I place a scale K of channels and I-beams upon the prismatic flange in which the numerals 3, 4, 5, 6, etc. in bold type represent the depth in inches of channels and I-beams. The vertical lines 20 turned up from the horizontal lines 21, Fig. 3, represent three-inch channels weighing respectively 4, 5, and 6 pounds per linear foot. The vertical lines immediately following the ones last described and shown in connection with the numeral 4 represent channels 4 inches deep, weighing respectively 5¼, 6¼ and 7¼ pounds per linear foot and so on up the scale, the numerals in bold type representing the depth, either of channels or beams in inches and the numerals on the lines extending upward from the line corresponding to line 21 representing the weight per linear foot for channels of that depth.

With each of the numerals 3, 4, 5, 6, etc. in bold type, there is another horizontal line 24 with downwardly extending vertical lines which, after numeral 3, are designated 5½, 6½ and 7½ respectively, and after the numerals 4, 7½, 8½, 9½ and 10½, respectively, many of the lead lines being omitted so as not to confuse the drawing at this point. These downwardly extending vertical lines represent the weight per linear foot of beams three inches deep, four inches deep, five inches deep, etc., so that by my invention I associate with each one of the numerals 3, 4, 5, 6, etc. characters or numerals which will show at a glance the weight per linear foot of either a channel or I-beam, of a certain depth.

Immediately under the fixed scale K, I place a logarithmic scale L on the upper portion of the plural slide 17 which represents varied span lengths of beams from 3′ 4″ to 100′. On the bottom flange I place a logarithmic scale P representing various loads per square foot of floor surface from one pound per square foot to 1000 pounds and immediately above this scale P, on the lower surface of the plural slide 17 I place a logarithmic scale N representing various spacings of beams from 8/10ths of a foot to 800 feet. Between the scales L and N and upon the plural slide 17 I locate an auxiliary logarithmic scale M to be used in finding the end reaction. Though in the usual operation of my invention the two portions of slide 17 move as one slide, they are capable, however, of relative movement for the following purpose. If the numbers on scale P be considered to represent thousands, it will be seen that 16,000 of P is opposite 50 of scale N. In other words, 50 of scale N marks the extreme fiber stress on scale P. If we wish to figure the beams or channels for any other extreme fiber stress, as, for instance, 12,500, it is only necessary to hold the L. I. of scale L at L. I. of scale K while 50 of scale N is shifted to 12,500 of scale P. Then, keeping scales L and N in this relative position, the problems will be solved as before, giving results corresponding to the desired extreme fiber stress. To show how this scale is used I have in Fig. 3 shown the slide 17 drawn to the right so as to bring 6 feet on the spacing scale N over 250 pounds the required load per square foot on scale P and given the length of the span which, say, is 16 feet on the scale L, a mere glance at scale K will determine instantly that given these conditions it will be necessary to use an I-beam 12 inches deep and 31 1/2 pounds per linear foot. This one example is merely given for it is thought that sufficient has been said to show how with any three of the conditions, (span, spacing, weight to be carried, size beams), known, the fourth can always be found, the key for the solving of such problems being located in the trough lying between scales K and P, said key being partly shown in Fig. 3, where the slide 17 has been drawn to the right sufficiently to show merely a portion of the key. This key in full is as follows:

| K/L/M/N/P | 38 $y=B'm$ $S/P$ | $y/L$ | 39 $y=$Space $y/P$ | B/L | 40 $y=$L'gth $y/S$ | B/$y$ | 41 $y=$Load per sq. ft. $S/P$ | B/L | 42 $y=$Load per lin. ft. $S/y$ | B/$l$ | 43 $y=\frac{\text{React'n}}{1000}$ $L/x$ | 44 $y=\frac{M}{1000}$ $x$ | L/S | 49 $y=ax$ $a/P$ $l/y$ | 50 $y=\frac{a}{x}$ $a/x$ $l/y$ | K/L/M/N/P |
|---|---|---|---|---|---|---|---|---|---|---|---|---|---|---|---|---|

An instance of the use of the auxiliary scale M to find the reaction R may be given as follows: Under the length 16' note the reading 125 on scale M; then under the same reading 125 on scale N find the required reaction, 12,000 pounds on scale P, see Fig. 3. The remaining operation to find the bending moment in a girder 12,000×5—1/2=66,000 is performed mechanically on the scales A, B, or C, D, the use of which is generally understood, the girder having two such beam reactions at points 5—1/2 feet from its ends, thus creating a bending movement of 66,000 foot pounds.

The scale P is so designed in its relation to the other scales that it represents (1) loads per square foot in pounds, (2) reactions in thousands of pounds, (3) moments of resistance, or bending moments in thousands of foot pounds. This last function enables the user to find the girder required in the above problem thus: Directly opposite the known bending moment 66,000 on scale P, we find the required girder on scale K, viz: 12″ I-beam 50 pounds per linear foot, or a 15″ channel 45 pounds per linear foot. As a 15″ I-beam 42 pounds per linear foot, to the right of the numeral 12, is a stronger beam and of lighter weight, it would probably be chosen by the designer of the structure. With a greater number of variable quantities on this face 4 of my structural slide rule as compared with the column slide rule a correspondingly greater number of problems are capable of mechanical solution by the beam or channel slide rule alone on this face 4 of my rule, or in conjunction with a general slide rule. Given any three of the factors, (1) size of beam or channel, (2) span in feet, (3) spacing in feet, (4) uniform load per square foot, the fourth is readily found. The different slides, 15, 16, 17 are interchangeable and solutions for a wide range of problems involving the following powers and roots of numbers may be had:

$$X_{\frac{1}{2}} = \sqrt{x} \qquad X_{\frac{2}{1}} = X^2$$

$$X_{\frac{1}{3}} = \sqrt[3]{x} \qquad X_{\frac{3}{1}} = X^3$$

$$X_{\frac{2}{3}} = \sqrt[3]{x^2} \qquad X_{\frac{3}{2}} = \sqrt{x^3}$$

$$X_{\frac{3}{4}} = \sqrt[4]{x^3} \qquad X_{\frac{4}{3}} = \sqrt[3]{x^4}$$

For instance, if slide 15 be inserted between scales K-P, we have the following solutions, and many more:

(1) $y=X^2$    B/C $l\,x$ / P $l\,y$      (2) $y=\sqrt[3]{x}$    B/C $l\,x$ / P $l\,y$ (3) $y=ax^2$    B/C $l\,x$ / P $a\,y$      (4) $y=a\sqrt[3]{x}$    B/C $a\,y$ / P $l\,x$ (5) $y=\sqrt{x^3}$    B $x$ / C / P $y$      (6) $y=\sqrt[3]{x^2}$    B $y$ / C / P $x$ (7) $y=a\sqrt{x^3}$ B $l\,x$ / C / P $a\,y$   (8) $y=a\sqrt[3]{x^2}$ B $a\,y$ / C / P $l\,x$ If slide 17 be inserted between scales A-C, we have among others the following:

(9) $y = \sqrt[3]{x^2}\dfrac{A\,l\,x}{L\,l\,y}$   (10) $y = \sqrt[3]{x^2}\dfrac{A\,l\,y}{L\,l\,x}$ On back of scale G shown in Fig. 8 one inch and one foot are each decimally divided on one half of the slide so that by comparison with the fractional divisions opposite on the other half, it is easy to find the decimal equivalent of any fraction of an inch or foot or vice versa.

Having described this invention in connection with illustrative embodiments thereof, to the details of which disclosure the invention is not, of course, to be limited, what is claimed as new and what is desired to be secured by Letters Patent is set forth in the appended claims.

1. A triangular rule having scales upon its different faces, slides adapted to coöperate with the respective faces, and keys for the solution of different problems adapted to be solved by the scales, said keys being normally located beneath the slides and visible when the slides are drawn out.

2. A triangular slide rule including coöperating scales and formed of a core or body portion and flanges or edges independently detachable from the core or body portion.

3. A triangular rule formed of a core or body portion, flanges or edges independently detachable from the core or body portion, and means to yieldingly hold the edges or flanges to the body portion.

4. A rule consisting of a core or body portion, a seat formed on the body portion, an edge or flange having a portion to coöperate with the seat and means for yieldingly holding the flange to the seat said means permitting lateral movement of the edge in addition to the yielding movement.

5. A rule consisting of a core or body portion, a seat formed on the body portion, an edge or flange having a portion to coöperate with the seat and means for yieldingly and adjustably holding the flange to the seat.

6. A triangular rule formed of a body or core, a plurality of edges or flanges supported by the body portion and slides mounted in the faces of the triangular rule, the face of said slides being flush with the surfaces of the edges or flanges.

7. A triangular slide rule formed of a body or core and two or more edges or flanges detachable from the core and means for yieldingly holding the flanges or edges to the body portion.

8. A triangular rule formed of a body or core and two or more edges or flanges detachable from the core and means for yieldingly and adjustably holding the flanges or edges to the body portion.

9. A triangular rule having a body portion or core, one or more seats formed on the body or core, and one or more detachable edges or flanges each edge or flange having a portion to coöperate with one of the seats on the core or body portion, and means for yieldingly securing the flange or edge to the core.

10. A triangular rule having a body portion or core, one or more seats formed on the body or core and one or more detachable edges or flanges each edge or flange having a portion to coöperate with one of the seats on the core or body portion, means for yieldingly securing the flange or edge to the core, and one or more slides mounted in the face or faces of the rule and adapted to be guided by said flanges or edges.

11. A triangular rule having a body portion or core, detachable flanges or edges, means for securing them to the body or core, and a plurality of slides mounted on different faces of the rule, two of them mounted on one face of the rule, and adapted for relative movement with relation to the flanges and to each other.

12. A triangular rule having a body portion or core, one or more holes in said body portion, one or more detachable flanges or edges, one or more screws mounted within the different holes in the core, one in each hole, and taking into the detachable edge or flange, and one or more springs mounted within the holes, one in each hole, and acting on the head of the screw and the bottom of the hole to yieldingly and adjustably hold the flange or edge to the core or body portion.

13. A triangular sliding rule having a core or body portion and one or more edges or flanges and means to adjust the flange or edge to the body portion to compensate for expansion and contraction or wear of adjacent parts.

14. A triangular slide rule having on one face, a plurality of scales representing load per square foot, spacing, span in feet, and numerals or marks designating structural material, the respective scales being adapted to be moved to solve mechanically problems involving (1) size of beam channels or other structural material, (2) span in feet, (3) spacing in feet, or, (4) uniform load per square foot when any three of them are given the scales on the different faces being adapted to be operated independently of each other.

15. A structural slide rule having on one face, a plurality of scales representing load per square foot, spacing, span in feet, and numerals or marks on scale designating structural material, the respective scales being adapted to be moved to solve mechanically problems involving (1) size of beam channels or other structural material, (2) span in feet, (3) spacing in feet, or, (4) uniform load per square foot when any three of them are given, and an auxiliary logarithmic scale to find the end reaction the scales on the different faces being adapted to be operated independently of each other.

16. A triangular slide rule having scales on its different faces, said scales being adapted to be operated independently of each other.

17. A structural slide rule having upon one face the ordinary slide rule, upon another face an independently operative column slide rule, and upon the third face a beam or channel slide rule operative independently of the others.

18. A structural slide rule having upon one face the ordinary slide rule, upon another face an independently operative column rule, and upon the third face a beam or channel slide rule operative independently of the others, the slides upon one or more of the faces being adapted to be used in connection with scales upon a face of the rule other than that with which they are normally meant to be used.

19. A structural slide rule having upon one face the ordinary slide rule, upon another face an independently operative column slide rule, and upon the third face, a beam or channel slide rule operative independently of the others and an auxiliary scale to determine the end reaction.

20. A triangular slide rule having a scale designating or representing the depth and weight of structural material, an independently operative scale representing span in feet, a scale representing spacing and one representing load per square foot operative independently of the others.

21. A triangular slide rule having a scale designating or representing the depth and weight per lineal foot of structural material, an independently operative scale representing span in feet, a scale representing spacing, and one representing load per square feet, the scales representing span in feet and spacing being mounted on the slide the scales being adapted to be operated independently.

22. A triangular slide rule having a scale designating or representing the depth and weight per lineal foot of structural material, an independently operative scale representing span in feet, a scale representing spacing, a scale representing load per square foot, the scale representing span in feet and spacing being mounted on the slide, and an auxiliary scale for determining the end reaction all the scales being adapted to be operated independently.

23. A triangular rule formed of a body, a plurality of edges supported by the body and provided with scales and a plurality of slides mounted in the faces of the rule to coöperate therewith.

24. An architect's scale formed of a body or core, two or more detachable edges or flanges secured to the core, and one or more slides mounted to slide between the edges or flanges, two edges or flanges coöperating to form a groove for one slide.

25. An architect's scale formed of a body or core, a plurality of edges or flanges secured to the core, a plurality of grooves formed by the edges or flanges, two edges or flanges coöperating to form a groove, a plurality of slides, the grooves and slides being formed of substantially the same size to permit the slides to be used interchangeably with different grooves to solve different problems.

JOHN L. HALL.

Witnesses:
HARRY L. DUNCAN,
JESSIE B. KAY.